3,167,824
SPONGE RUBBER WEATHERSEAL
John J. Berwanger, Hinsdale, Ill., assignor to Hood Sponge Rubber Company, Chicago, Ill., a corporation of Illinois
Filed Apr. 12, 1961, Ser. No. 102,617
3 Claims. (Cl. 20—69)

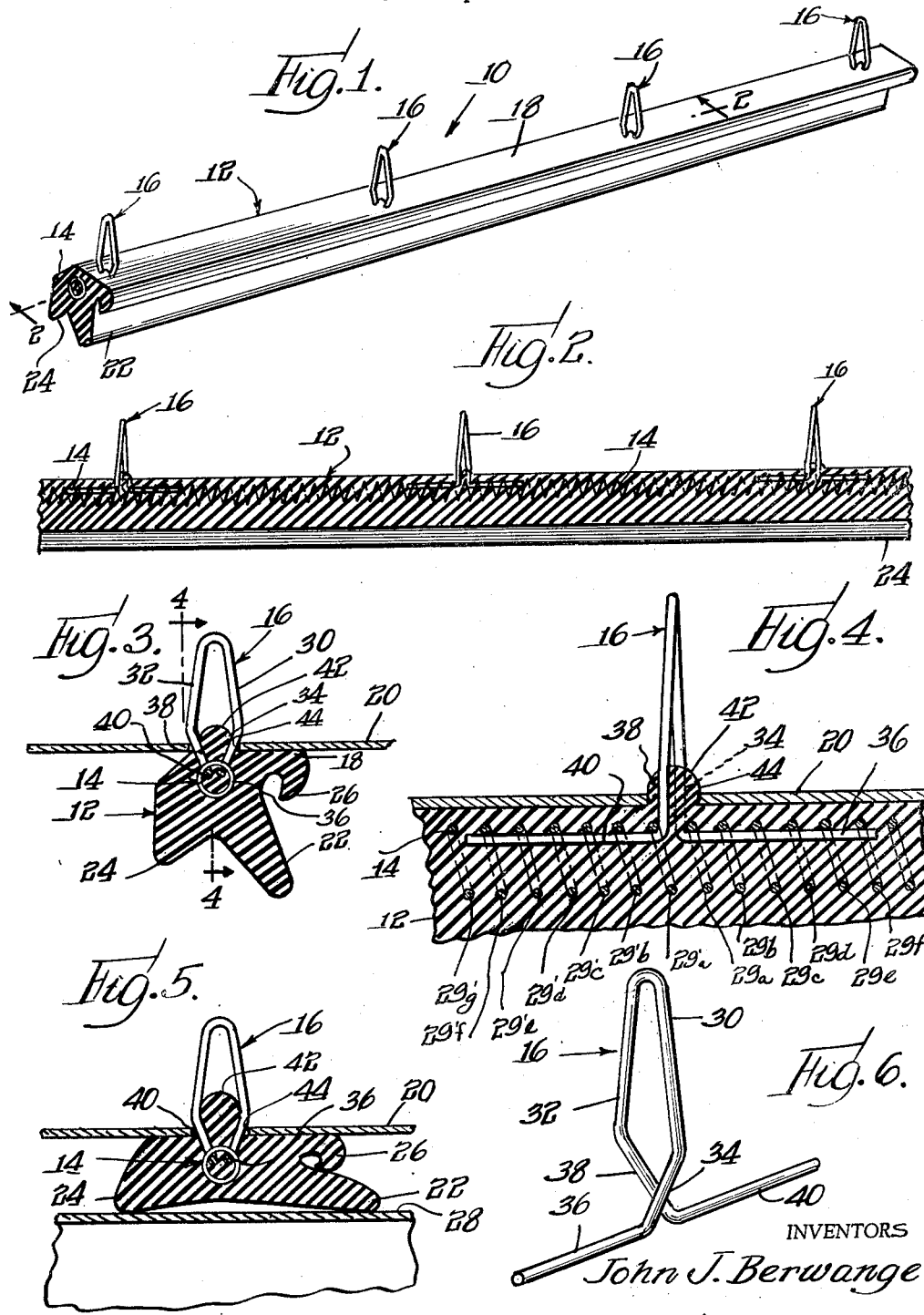

This invention relates to reinforced, flexible weatherseal and particularly to a longitudinally extensible and compressible weatherseal construction adapted to provide an air-tight and weather-tight seal for a closure.

In the design and manufacture of modern automobiles, strips of rubber weatherseal are provided for door, hood, and deck lid openings to shield against drafts and the seepage of water when the particular closure for the opening is in closing engagement with the body of the vehicle. Heretofore, the weatherseal construction employed for this service, although satisfactory in some respects possessed certain shortcomings. More specifically, certain of the prior weatherseal arrangements required the use of an adhesive for securing the weatherseal properly in place on a metal panel. Oftentimes, the adhesive would loosen, thereby causing the weatherseal to become disengaged from the metal panel. Other weatherseal constructions provided heretofore were secured to metal panels by mechanical fasteners of various types, some of which were integrally associated with the weatherseal. An undesirable feature accompanying certain of these arrangements was that a very accurate spacing was required in the location of the fastener receiving holes in the metal panel. In instances where the holes in the panel for accommodating the fasteners were misplaced in the slightest degree, other holes properly in register with the fastener were required to be drilled in the panel, thereby greatly increasing the cost of assemblying the vehicle. In prior weatherseal construction employing reinforcing members to enhance the holding power of the mechanical fasteners, the inherent flexibility of the rubber sealing material was diminished to a point where the installation of the weatherseal was exceedingly difficult, if not impossible, on metal members having sharp corners or curves of small radii and the like. It is also to be appreciated that many prior reinforced weatherseals could not be manually stretched or compressed in the slightest degree during the installation thereof on automobile bodies.

Having in mind the shortcomings of prior art weatherseals, it is an important object of this invention to provide a reinforced weatherseal which possesses a high degree of flexibility in all planes so as to facilitate ready installation thereof around sharp corners and curves of small radii or the like.

Another object is to provide an improved reinforced weatherseal construction which may be longitudinally compressed or extended a slight degree during the installation thereof without rupturing the bond between the yieldable seal material and the reinforcing means.

In conjunction with the last mentioned object, it is still another object to provide a weatherseal which may be stretched or compressed to register the clips carried thereby with non-uniformly spaced holes in an associated sheet metal member or panel.

A further object of this invention is to provide a weatherseal which is simple in design and construction, highly practical in use, economical to manufacture, and which is adapted to be installed quickly and easily without the use of hand tools.

Further features of the invention pertain to the particular arrangement of the elements thereof whereby the above-outlined and additional operating features thereof, are attained.

The invention, both as to its organization and method of operation, together with further objects and advantages thereof, will best be understood by reference to the following specification taken in connection with the accompanying drawing, wherein like reference numerals have been used to designate like parts throughout, in which;

FIG. 1 is a fragmentary perspective view of a strip of weatherseal made in accordance with and embodying the principles of the present invention;

FIG. 2 is a longitudinal, vertical sectional view of the weatherseal of FIG. 1 taken generally in the direction of the arrows along the line 2—2 thereof;

FIG. 3 is an enlarged, transverse, vertical sectional view showing the weatherseal of FIG. 1 operatively secured to an associated sheet metal element;

FIG. 4 is a further enlarged, fragmentary, longitudinal, vertical sectional view taken generally in the direction of the arrows along the line 4—4 in FIG. 3;

FIG. 5 is an enlarged, transverse, vertical sectional view similar to FIG. 3 but showing the weatherseal in the condition thereof wherein it is deformed by a closure; and FIG. 6 is a further enlarged, perspective view of an attachment clip of the present invention.

Referring now to FIGURE 1 of the drawings, there is shown therein a strip of weatherseal generally designated by the numeral 10 made in accordance with and embodying the principles of the present invention. The weatherseal 10 includes a sealing strip 12, a reinforcing member 14 and a plurality of attachment clips 16.

Referring now to FIGS. 1 and 3 particularly, the sealing strip 12 is a greatly elongated member composed of highly yieldable material such as for example, sponge rubber, ordinary soft rubber, or natural or synthetic rubbers. A generally flat surface 18 is provided on the strip 12 to engage a complementary surface of a sheet metal element 20 such as may be found around the door or deck lid openings and the like on an automobile. While the surface 18 has been illustrated as flat, it is intended to make complementary conformation with the cooperating surface to be sealed. Opposite the flat surface 18 the sealing strip 12 is of an irregular transverse conformation. More specifically, a longitudinally extending major or first flange 22 having a V-shaped cross section extends outwardly from the central position of the strip 12 in the direction away from the surface 18. A minor or second flange 24 having a stubbier cross section than that of the flange 22 also extends longitudinally of the strip 12 and is disposed in a transversely spaced relationship to the flange 22. A hook-like flange 26 is provided adjacent to the flat surface 18 curving away therefrom in the direction toward the tip of the first flange 22. When the sealing strip 12 is deformed in use, such as by an abutment member 28 (see FIG. 5) which may extend generally parallel to the sheet metal element 20, the flanges 22 and 24 move apart while the free end of the hook-like flange 26 curls into the outwardly disposed side wall of the first flange 22 thereby providing a substantially air-tight and weather-tight seal between the elements 22–28.

The reinforcing member 14 extends substantially the entire longitudinal extent of the sealing strip 12 and has the general form of a coil spring, as clearly shown in FIGS. 2 and 4. Being embedded in the sealing strip 12 below the flat surface 18, the individual wire loops 29 of the spring reinforcing member 14 are normally spaced apart each from the other and are each entirely surrounded by the highly yieldable material which composes the body of the strip 12. In other words, the plastic material of the strip 12 extends within the cylinder-like, interior portion of the spring which is defined by the loops 29 thereof. Being spaced apart longitudinally of the axes of the sealing strip 12 and the reinforcing member 14, the wire loops 29 permit spring-like compression of the weatherseal 10 as well as spring-like extension thereof. It is to be appreciated that inasmuch as the wire loops 29 are entirely surrounded by the rubber material of the sealing strip 12, there is a great area of intimate contact therebetween whereby a tenacious bond is formed between the rubber material and the reinforcing member 14. It has been found that this bond withstands extension and compression of the strip 10 without rupture.

The attachment clips 16 are disposed at longitudinally spaced intervals along the weatherseal 10 projecting outwardly from the flat surface 18 of the strip 12. Referring to FIG. 6, each attachment clip 16 is made entirely of wire having a diameter somewhat greater than that of the wire loops 29 of the reinforcing member 14. The attachment clip 16 includes the two spaced apart legs 30 and 32 which are interconnected at the upper portions thereof to form a head portion of the clip 16 having the shape of an inverted U. Diverging from the leg 32 to propide spring characteristics, the lower portion of the leg 30 interconnects with a slightly inwardly extending first shank member 34 which extends downwardly to interconnect at an abrupt bend with a first foot portion 36. Similarly, the lower portion of the leg 32 interconnects with a slightly inwardly extending second shank member 38 which extends downwardly to interconnect at an abrupt bend with a second foot portion 40 extending in the direction opposite to that of the first foot portion 36. It is to be appreciated that the foot portions 36 and 40 are each disposed parallel to a line which is generally perpendicular to the plane of the U-shaped head portion of the clip 16.

As arranged on the reinforcing member 14, the attachment clip 16 is disposed with the first 34 and the second 38 shank members each engaging next adjacent loops 29 of the spring-like reinforcing member 14. Referring to FIG. 4 more particularly, the first shank member 34 engages the loop of wire 29a and the first foot portion 36 engages at a series of aligned points along the inside of a group of coils designated 29a through 29f. Similarly, the second shank member 38 engages the loop of wire immediately adjacent the loop 29a, this loop being designated 29'f. The second foot portion 40 engages at a series of aligned points disposed along the inside of a second group of wire coils, here designated with primes, 29'a through 29'f. It has been found that by this arrangement of the attachment clip 16 on the reinforcing member 14, a very great pulling force may be applied to the head portion of the clip 16 without causing the reinforcing member 14 to tear through the sealing strip 12 since such a pulling force is distributed over a substantial longitudinal extent of the weatherseal 10 by the groups of coils 29 and is not applied as a "point load" as was heretofore the practice. It is also to be recognized that in this embodiment of the invention the foot portions 36 and 40 extend generally parallel to the longitudinal axis of the weatherseal 10 and that the general plane of the head portion of the clip 16 is disposed transversely of the weatherseal 10 although it may be otherwise arranged without departing from the scope of the invention.

In manufacturing the weatherseal 10, a length of spring wire is wound into coil form having individual loops 29 spaced apart a small distance, such as for example .030 inches. The attachment clips 16, having a diameter of wire greater than that of the wire of the coil spring reinforcing member 14, are inserted into the member 14 so that each foot 36, 40 engages a separate group of coils 29. Each clip 16 may be spaced on three or four inch centers from the next adjacent clip along the length of the reinforcing member 14. Thereafter the coil spring reinforcing member 14 having the clips 16 secured thereto may be placed in a cavity of a mold (not shown) so that the clips 16 extend through slots provided in one wall of the mold. It is to be appreciated that the mold may be of any cross section depending upon the configuration of the finished weatherseal desired. After the reinforcing member 14 is properly located in the mold cavity, the halves of the mold may be closed. Thereafter, the mold cavity may be filled by injecting therein a light and foamy vulcanizible latex compound or the like. It is to be recognized that the foamy material will completely surround each of the wire loops 29 of the reinforcing member 14 and upon gellation and subsequent vulcanization, will form a highly tenacious bond therewith. In this condition, the cured material of the strip 12 fixedly supports the clip 16 to hold the foot portions 36, 40 thereof in firm engagement with the aligned series of points on the inside of the loops 29 of the respectively associated groups thereof. The foot portion 36, 40 being in point contact with the coils 29 and supported thereagainst by the material of the strip 12, it is to be recognized that the clip 16 may be pivoted about the line defined by the points of contact through an angle of approximately 120 degrees. The head portion of the clip also may be twisted a slight extent with respect to the longitudinal axis of the strip 10. These features greatly facilitate insertion of the clip 16 in misspaced holes and around sharp curves.

Upon removal of the weatherseal 10 from the mold, the clips 16 protrude through the flat surface 18 of the strip 12. A small protuberance 42 extends outwardly from the surface 18 between the legs 30, 32 of the head portion of each clip 16, clearly shown in FIGS. 3, 4 and 5.

Since the reinforcing member 14, being in coil spring form, does not detract from the flexibility of the rubber sealing strip 12, the weatherseal 10 may be fastened around sharp corners, curves of small radii, etc. Concomitant with this feature, the weatherseal 10 is adapted to provide for easy installation thereof around automobile door, hood and deck-lid openings and the like, without the use of any hand tools. More explicitly, the sheet metal members which define the aforementioned openings (shown fragmentarily in FIGS. 3 and 5) are provided with holes 44 spaced apart therealong a distance approximately equal to the spacing between the attachment clips 16. Each hole 44 is of a size that will permit snug insertion of the free end of the clip 16. As the head portion of the attachment clip 16 is urged further into the hole 44, the legs 30, 32 resiliently converge until they have passed fully therethrough and thereafter resiliently diverge leaving the shank members 34, 38 firmly engaging the walls of the hole to hold the weatherseal 10 securely to the sheet metal element 20. Being compressed by the legs 30, 32, the rubber protuberance 42 is also urged through the hole 44 and provides a sponge rubber gasket.

In cases where adjacent holes 44 are spaced apart a distance greater than the spacing of the attachment clips 16, the weatherseal 10 may simply be stretched until the respective clip 16 is in register with the associated hole 44 for insertion therein. And conversely, where adjacent holes 44 are spaced closer together than the spacing of the clips 16, the weatherseal 10 may be compressed a slight extent to bring the respective clip 16 into register with the associated hole 44. The distance that the weatherseal 10 may be compressed is limited only by the lateral buckling of the rubber material which may be objectionable in appearance at some locations on an automobile while acceptable at others.

Thus, it will be seen that there has been provided an improved reinforced weatherseal which has universal flexibility in all directions, and particularly in lateral and longitudinal directions, and may be installed in areas of sharp bends and which fulfills all of the objects and advantages set forth above.

While there has been described what is at present considered to be the preferred embodiment of the invention, it will be understood that various modifications may be made therein, and it is intended to cover in the appended claims all such modifications as fall within the true spirit and scope of the invention.

The invention is hereby claimed as follows:

1. A longitudinally yielding sealing strip for attachment to a panel having a series of apertures spaced apart therein; said sealing strip comprising a resiliently deformable, elongate body of rubber-like material, an elongate helical coil spring reinforcing member embedded in and embraced by said body, a plurality of spaced apart attachment clips for securing said sealing strip to the associated panel, each attachment clip including a head portion extending outwardly from said body for insertion into the respectively associated apertures in the panel and a pair of oppositely extending elongate foot portions imbedded in said body material, each foot portion being juxtaposed with the inner surfaces of a plurality of next adjacent coils of said coil spring on opposite sides of the head portion in generally straight line arrangement to provide a mechanical interconnection with the adjacent coils as well as the imbedded connection with the body material resisting relative separation between each clip and the spring while permitting swinging of each clip through a substantial angle along an axis substantially parallel to the longitudinal axis of the spring.

2. A longitudinally yielding sealing strip for attachment to a panel having a series of apertures spaced apart therealong; said sealing strip comprising a resiliently deformable, elongate body of rubber-like material, an elongate helical coil spring reinforcing member embedded in said body having the individual coils thereof entirely surrounded by said rubber-like material, a plurality of spaced-apart attachment clips for securing said sealing strip to the associated panel, each attachment clip including a head portion extending outwardly from said body for insertion into the respectively associated aperture in the panel and a pair of oppositely extending elongated foot portions imbedded in said body material, each foot portion having portions thereof in substantially straight-line point to point juxtaposition with the inner surfaces of a plurality of next adjacent coils of said coil spring on opposite sides of the head portion to provide a mechanical interconnection with the adjacent coils as well as the imbedded connection with the body material resisting relative separation between each clip and the coil spring while permitting swinging of each clip through a substantial angle along the axis of the point to point juxtaposition between the foot portions and the spring coils.

3. A longitudinally stretchable and compressible sealing strip for attachment to a panel having a series of apertures therein spaced apart therealong; said sealing strip comprising a resiliently stretchable, elongate body of sponge rubber material, an elongate helical coil spring reinforcing member embedded in and extending longitudinally throughout said body, said reinforcing member having the individual coils thereof, normally spaced apart and entirely surrounded by said rubber material, a plurality of equally spaced apart wire attachment clips for securing said sealing strip to the associated panel, each attachment clip including an inverted, generally U-shaped head portion extending outwardly from said body for insertion into the respectively associated aperture in the panel, the plane of said head portion being disposed substantially at a right angle to the longitudinal axis of said reinforcing member, and a pair of oppositely extending elongate foot portions on each attachment clip disposed generally perpendicular to the plane of said head portion material, each foot portion being imbedded in said body and being juxtaposed with the inner surfaces of a plurality of next adjacent coils of said coil spring on opposite sides of the head portion in generally straight-line arrangement to provide a mechanical interconnection with the adjacent coils as well as the imbedded connection with the body material resisting relative separation between each clip and the spring while permitting swinging of each clip through a substantial angle along an axis substantially parallel to the longitudinal axis of the spring.

References Cited in the file of this patent
UNITED STATES PATENTS

| | | |
|---|---|---|
| 1,918,134 | Resch | July 11, 1933 |
| 2,601,512 | Gagnier | June 24, 1952 |
| 2,607,965 | Gagnier | Aug. 26, 1952 |
| 2,612,665 | Scott | Oct. 7, 1952 |
| 2,683,907 | Lovasik | July 20, 1954 |
| 2,719,343 | Harris | Oct. 4, 1955 |